United States Patent [19]

Villarroel

[11] 3,771,348

[45] Nov. 13, 1973

[54] ANALOG FLUERIC GAS CONCENTRATION SENSOR

[75] Inventor: Fernando Villarroel, Bowie, Md.

[73] Assignee: The United States of America as represented by the Secretary of the Army, Washington, D.C.

[22] Filed: Feb. 28, 1972

[21] Appl. No.: 229,940

[52] U.S. Cl. .................................... 73/23, 73/196
[51] Int. Cl. .......................................... G01n 31/00
[58] Field of Search ..................... 73/23, 30, 196, 3

[56] References Cited
UNITED STATES PATENTS
2,790,320  4/1957  Salko et al. ....................... 73/196 X
2,293,725  8/1942  Fiock et al. ............................. 73/3

Primary Examiner—Jerry W. Myracle
Attorney—Harry M. Saragovitz et al.

[57] ABSTRACT

A flueric gas concentration sensor consisting of two identical flow channels exhausting to a common output chamber is described. A reference gas is introduced into one of said flow channels and an unknown sample gas is introduced into the other. Both gases are drawn through the respective channels by a suction unit connected to the common output chamber. Each respective flow channel consists of one linear flueric resistor, one small cavity, and one quadratic flueric resistor. The pressure differential between the respective small cavities is measured as an indication of the concentration of the unknown sample gas.

10 Claims, 1 Drawing Figure

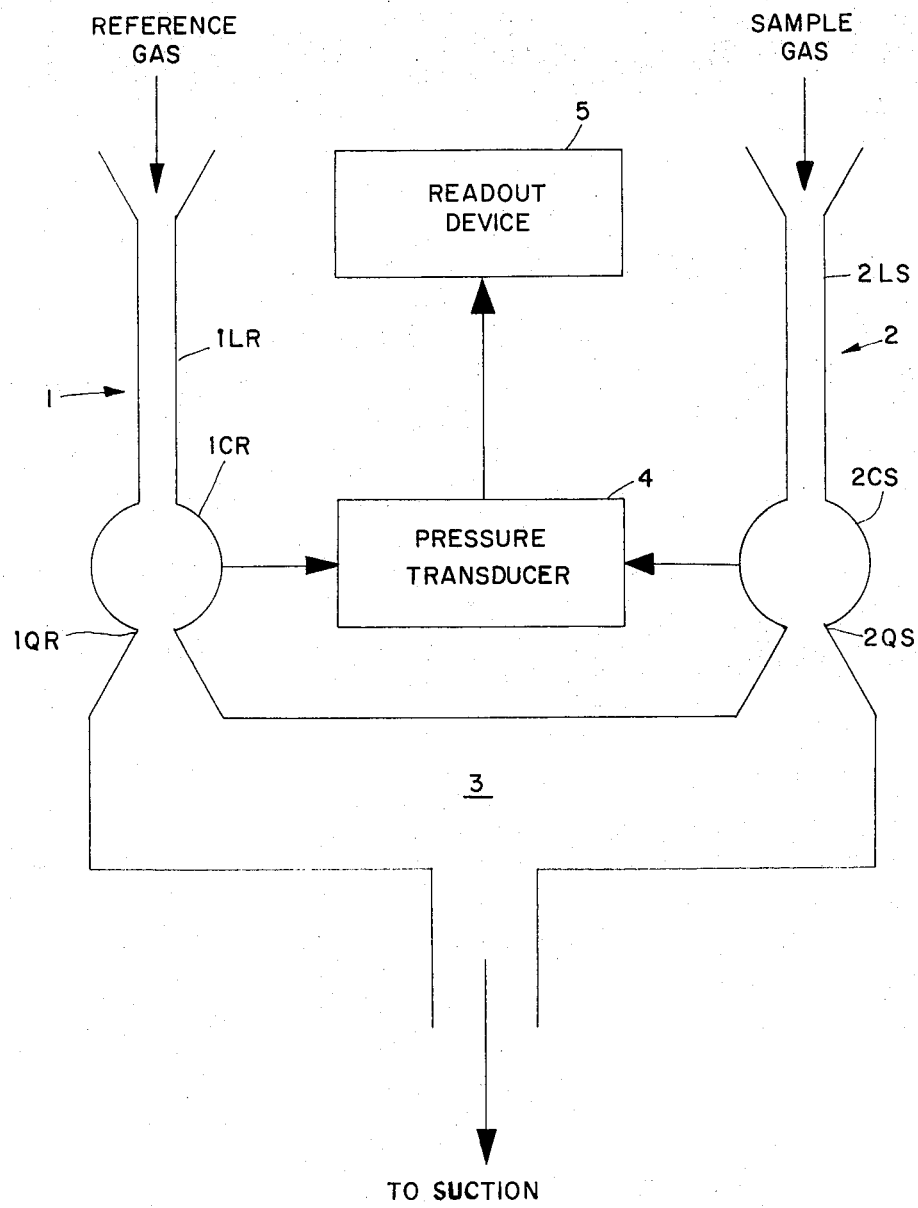

ANALOG FLUERIC GAS CONCENTRATION SENSOR

RIGHTS OF GOVERNMENT

The invention described herein may be manufactured, used and licensed by or for the United States Government for governmental purposes without the payment to me of any royalty thereon.

BACKGROUND OF THE INVENTION

1. Field of the Invention

This invention relates to an analog flueric gas concentration analyzer which facilitates the measurement of gas concentration as a pressure differential between two identical flow channels.

2. Description of Prior Art

Methods have been developed in the past for analyzing gas concentration by analyzing various physical properties of a gas. These methods include the use of interferometers, mass spectrameters, spectrophotometers, thermal conductivity devices, acoutic devices and many other well known gas analyzers.

All of the above devices are expensive to manufacture; are bulky in nature; and often require electronic controls and readout devices.

The use of electronic controls and other electrical equipment has seriously limited the usefulness of prior art devices. For example the use of electronic devices is limited in explosive environments such as those encountered in medical operating rooms.

SUMMARY OF THE INVENTION

Accordingly it is an object of the present invention to provide a novel flueric gas concentration analyzer.

It is another object of the present invention to provide a flueric gas concentration analyzer which is extremely inexpensive to manufacture.

It is still another object of the present invention to provide a flueric gas analyzer which can be easily miniaturized and has unlimited flexibility of design.

It is a further object of the present invention to provide a flueric gas analyzer in which the flueric output signal is in analog form, so that it can be directly used in conjunction with other flueric systems.

It is still a further object of the present invention to provide a flueric gas analyzer which is safe to use in an explosive environment.

These and other objects of the invention are achieved by providing a flueric gas analyzer having two identical flow paths or channels, each channel consisting of one linear flueric resistor, one small cavity, and one quadratic flueric resistor. Both channels are in communication with a common output chamber which is connected to a suction device. A reference gas, such as air, is introduced into one channel and a sample gas, such as an unknown mixture of carbon dioxide and air, is introduced into the other channel. Both gases are drawn through the respective channels by the suction device connected to the common output chamber. The pressure differential between the small cavities of the two respective channels is measured as an indication of the unknown gas concentration.

The gas concentration analyzer of the present invention may be used in combination with a respiratory cycle monitor to measure the concentration of carbon dioxide exhaled by a medical patient or the concentration of oxygen which is inhaled. In this example air could be used as the reference gas.

The gas concentration analyzer of the present invention could also be used as a detection device in a process controller which would actuate automatic controls in response to the detection of a predetermined gas concentration.

BRIEF DESCRIPTION OF THE DRAWINGS

A more complete appreciation of the invention and many of the attendant advantages thereof will become more apparent and better understood by reference to the following detailed description when considered in connection with the accompanying drawing wherein the sole FIGURE is a schematic illustration of the flueric gas concentration analyzer of the present invention.

DESCRIPTION OF THE PREFERRED EMBODIMENT

Before completing the description of the apparatus of the present invention, it should be noted that the word "flueric" is a known word of art which specifically refers to a purely fluid element, that is, one having no moving parts and thus no chance for breakdown or failure. In contradistinction, the words "fluidic" or "fluid" are much broader than the term "flueric" and are known in the art to refer to any type of fluid element, such as those having diaphragms, pistons and similar moving parts. These known definitions of the words "fluid", "fluidic" and "flueric" are further exemplified by reference to the *Military Standard Fluidics Terminology and Symbols Textbook*, dated July 17, 1968, and generally referred to as "MIL–STD–1306." This document is an official Department of Defense publication.

Referring to the drawing in more detail there is shown a flueric gas concentration analyzer including two identical flow channels 1 and 2. Each channel 1 and 2 is provided with a linear flueric resistor designated 1LR and 2LS, respectively; a small cavity designated 1CR and 2CS, respectively; and a quadratic flueric resistor designated 1QR and 2QS, respectively. The two flow channels 1 and 2 are connected to a common output chamber 3. The linear flueric resistors 1LR and 2LS are formed from linear flow channels connected between the channel inlets and cavities 1CR and 2CS. The quadratic flueric resistors 1QR and 2QS are formed by small orifices between cavities 1CR and 2CS and common output chamber 3. The shape of cavities 1CR and 2CS are shown as being circular in the preferred embodiment. However, this shape is not critical and many other shapes can be used without departing from the spirit of the invention.

A reference gas of known concentration is introduced into channel 1 and a sample gas of unknown concentration is introduced into channel 2. In a preferred embodiment the reference gas is air and the sample gas is a mixture of carbon dioxide and air. However, other gases may be used without departing from the spirit and scope of this invention. Flow of the reference and sample gases is established by a suction device connected to the common output chamber 3. A pressure transducer 4 of any well known type is connected between cavities 1CR and 2CS to measure the differential pressure which results as the gases flow through the respective channels. If desired, the sensitivity of the analyzer may be improved by providing a differential fluidic amplifier between the pressure transducer 4 and cavities 1CR and 2CS. A suitable readout device 5 is provided to indicate the unknown gas concentration as a function of the differential pressure between cavities 1CR and 2CS.

The flow channels 1 and 2 and the common chamber 3 of the present invention in a preferred embodiment may be integrally molded or formed in any other way in the surface of a single plastic block. A planar cover plate also of plastic may be provided to seal the channels. Due to this simple construction the flueric gas analyzer of the present invention can be manufactured with minimal cost and may be easily miniaturized with almost infinite design possibilities.

DESCRIPTION OF OPERATION

The operation of the gas analyzer of the present invention may best be described with reference to the following equation which predicts the differential pressure ($\Delta P_C = P_{CR} - P_{CS}$) between the cavities 1CR and 2CS.

$$\Delta P_C/\Delta P_T = (1/2\theta) [(1/k) ( \sqrt{1 + k\, 4\theta} - 1) - ( \sqrt{1 + 4\theta} - 1)]$$

where $k = (\rho/\mu^2) s/ (\rho/\mu^2)R$ $\rho$ = density of the gas $\mu$ = viscosity of the gas $\Delta P_T$ = total differential pressure across the sensor from inlet to outlet $\Delta P_L$ = differential pressure across the linear resistor $\Delta P_Q$ = differential pressure across the quadratic resistor $\Delta P_C$ = differential pressure between the two cavities R (subscript) = reference gas, s (subscript) = unknown gas $\theta = \Delta P_T \Delta P_Q / \Delta P_L^2$, reference gas The total differential pressure $\Delta P_T$ between the inlet and outlet of the analyzer ($\Delta P_T = \Delta P_L + \Delta P_Q$) remains constant once flow is established by the suction device. Therefore, the differential pressure between the reference and sample channels may be measured across cavities 1CR and 2CS as an indication of the concentration of the unknown gas sample.

In its preferred embodiment the flueric gas concentration analyzer of the present invention consists entirely of flueric components. Thus the present invention provides a gas concentration analyzer which is compact, noiseless, vibration free and safe to use in explosive environments.

It should be understood that the invention is not limited to the exact instructions shown and described herein for obvious modifications will occur to persons skilled in the art.

What is claimed is:

1. A flueric gas analyzer comprising:
   a. a source of reference gas;
   b. a source of unknown sample gas;
   c. first flow channel means of a first predetermined flueric resistance for receiving said reference gas;
   d. second flow channel means of the same flueric resistance as said first flow channel means for receiving said unknown sample gas;
   e. suction means for drawing said reference gas and sample gas through said first and second channels; and
   f. means for measuring the difference in pressure between the first and second channels for developing a signal representative of the concentration of the unknown sample gas.

2. A gas analyzer according to claim 1, wherein said predetermined flueric resistance in each channel comprises a linear flueric resistance in series with a quadratic flueric resistance.

3. A gas analyzer according to claim 2, wherein each of said linear flueric resistors consist of a linear portion of the same length in each channel and the quadratic flueric resistors consist of orifice means of the same diameter at the end of each of said channels.

4. A gas analyzer according to claim 3, wherein there is further provided a cavity in each of said channels and said means for measuring a difference in pressure is connected to both of said cavities.

5. A gas analyzer according to claim 4, wherein there is further provided an output chamber in communication with said first and second chambers at one end thereof and in communication with said suction means at another end thereof.

6. A gas analyzer according to claim 5, wherein said first and second channels and said output chamber are integrally formed in a plastic block.

7. A gas analyzer according to claim 4, wherein said cavity is disposed between said linear and quadratic resistances in each channel.

8. A gas analyzer according to claim 2, wherein there is further provided a cavity in each of said channels and said means for measuring a difference in pressure is connected to both of said cavities.

9. A gas analyzer according to claim 8, wherein there is further provided an output chamber in communication with said first and second chambers at one end thereof and in communication with said suction means at another end thereof.

10. A gas analyzer according to claim 8, wherein said cavity is disposed between said linear and quadratic resistances in each channel.

* * * * *